(12) United States Patent
Kimura et al.

(10) Patent No.: US 6,870,802 B1
(45) Date of Patent: Mar. 22, 2005

(54) INFORMATION REPRODUCTION APPARATUS WITH SELECTIVE CLV AND CAV CONTROL

(75) Inventors: Naohiro Kimura, Kyoto (JP); Katsuya Watanabe, Nara (JP); Hiromichi Ishibashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/979,577

(22) PCT Filed: May 26, 2000

(86) PCT No.: PCT/JP00/03430

§ 371 (c)(1),
(2), (4) Date: Nov. 19, 2001

(87) PCT Pub. No.: WO00/74052

PCT Pub. Date: Dec. 7, 2000

(30) Foreign Application Priority Data

May 27, 1999 (JP) .............................. 11-147936

(51) Int. Cl.$^7$ ................................................ G11B 7/00
(52) U.S. Cl. ................................ 369/47.41; 369/53.31
(58) Field of Search .......................... 369/47.41, 47.45, 369/47.46, 53.31

(56) References Cited

U.S. PATENT DOCUMENTS 4,558,375 A * 12/1985 Sontheimer ................ 386/108
5,347,506 A * 9/1994 Matsudo et al. ........... 369/53.29
5,687,148 A * 11/1997 Uemura .................... 369/47.41
5,805,548 A * 9/1998 Ishihara et al. ........... 369/47.43
5,883,866 A * 3/1999 Shimizume et al. ....... 369/47.41
6,137,757 A * 10/2000 Kinoshita ................. 369/47.41

FOREIGN PATENT DOCUMENTS

| JP | 01-194171 | 4/1989 | |
| JP | 05-081759 | 2/1993 | |
| JP | 06-004999 | 1/1994 | |
| JP | 07-235126 | 5/1995 | |
| JP | 11-306661 | 5/1999 | |
| JP | 411306661 A | * 11/1999 | ............ G11B/19/28 |

* cited by examiner

Primary Examiner—Hoa T. Nguyen
Assistant Examiner—Peter Vincent Agustin
(74) Attorney, Agent, or Firm—Renner, Otto, Boisselle & Sklar, LLP (57) ABSTRACT

An information reproduction apparatus of the present invention comprises a rotating section 2 for rotating an information carrier 1 on which a unit of continuous information capable of being continuously read out is recorded, a CLV control section 9 for controlling the rotating section in such a manner that the information carrier is rotated at a constant linear velocity, a CAV control section 9 for controlling the rotating section in such a manner that the information carrier is rotated at a constant angular velocity, a rotation control selection 14 for selectively operating the CLV or CAV control section, and an information determination section 14 for detecting an information length of the continuous information. The rotation control selection section is constructed in such a manner as to selectively operate the CLV or CAV control section based on a result of the detection of the information length of the continuous information.

6 Claims, 5 Drawing Sheets

INFORMATION REPRODUCTION APPARATUS WITH SELECTIVE CLV AND CAV CONTROL

TECHNICAL FIELD

The present invention relates to an information reproduction apparatus for reproducing information recorded on a disk-like information carrier, the disk-like information carrier, and an information recording apparatus for recording information on the information carrier.

BACKGROUND ART

CDs (Compact Disk) and DVDs (Digital Versatile Disk) have respective unified physical format standards in which information is recorded into prepits at a linear velocity of 1.3 m/s for CDs and at a linear velocity of 3.49 m/s for DVDs regardless of whether the information is audio/video information or code information.

For apparatuses (CD players and DVD players) for reproducing audio/video information thus recorded on a disk at a constant linear velocity, conventionally, access performance is not considered to be important, and CLV (Constant Linear Velocity) control is performed in order to secure a low level of noise and vibration. In CLV control, the number of revolutions of a spindle motor is controlled in such a manner that a transfer rate (or linear velocity) is constant over a disk range from an inner circumference to an outer circumference of the disk. Such control is achieved as follows. The phase of the frequency of a reproduction clock in a PLL (Phase-Locked Loop) control section of a signal processing circuit is synchronized with the phase of the frequency of a reference clock obtained by frequency-dividing a quartz oscillator, and the frequency of the reproduction clock is controlled using the frequency of the frequency-divided reference clock, thereby generating a control signal for the spindle motor.

For apparatuses for reproducing a disk in which computer code information is recorded (a CD-ROM [Read-Only Memory] drive and a DVD-ROM drive), jitter-free for controlling the reproduction clock frequency per se of the PLL of the signal processing circuit is introduced, and CAV (Constant Angular Velocity) control is performed to obtain satisfactory fast-speed access performance. In CAV control, a spindle motor is controlled in such a manner that the number of revolutions is constant over a disk range from an inner circumference to an outer circumference of the disk.

Recently, hybrid disks which are CDs, DVDs, or the like in which audio or video information and computer code information are mixed have been produced. For such disks, conventionally, there is not a definition, a regulation, nor a proposal as to the order of pieces of information to be recorded, and a disk site at which information about the size of a unit of information will be recorded on the disk. For example, a considerably large size of code information may be recorded after a considerably short-time of music. Conversely, a considerably small size of code information may be recorded after a considerably long-time of music.

For such a disk, in the conventional art, audio/video information and code information are all reproduced by either a CLV control method or a CAV control method. Specifically, all information on the disk is subjected to data processing for audio/video information using CLV control where a transfer rate is reduced all over the disk. Alternatively, all information on the disk is subjected to data processing for code information (specifically, information, such as audio, is also temporarily stored in a cache memory or the like and thereafter transferred as memory information to the outside) using CAV control where a transfer rate is increased toward the outer circumference of the disk.

In the case where all information on a disk is reproduced using CLV control, code information is reproduced using CLV control even if code information is predominantly recorded on the disk. In such a case, even when code information is randomly accessed from an application on a host computer, the response time of a spindle motor predominantly occupies the access time, resulting in a significant reduction in access speed. Further, the noise caused by driving the motor in the access causes problems.

In the case where all information on a disk is reproduced using CAV control, random access seldom occurs since audio/video information is predominantly recorded. Although a host computer exhibits almost the same performance in outputting audio or displaying moving images if a transfer rate is greater than or equal to a predetermined value, a spindle motor is rotated at a higher speed greater than or equal to a required value, so that rotation, or vibration due to mass eccentricity or the like causes noise.

For a kind of CD (CD-EX (Extra) or the like), a reproduction apparatus capable of switching between CLV and CAV control is available, in which music information is subjected to CLV control, while code information, such as data relating to lyrics or songs, or artist information, is subjected to CAV control. Such a reproduction apparatus distinguishes audio information from code information using disk information recorded in a lead-in area, a TOC (Table Of Contents) area, and the like, or a sub-code defined in a logical format. Based on this identification, CAV control and CLV control are switched.

In the above-described technique in which CLV control and the CAV control are switched, when a disk is sequentially read from an inner circumference toward an outer circumference, a switching operation between CLV control and CAV control occurs every time the type of information is changed, resulting in a reduction in an average reproduction rate. Further, noise or heat is generated in a spindle motor in the switching.

The present invention is provided to solve the above-described problems. The object of the present invention is to provide: an information reproduction apparatus which appropriately selects CLV or CAV control, depending on information to be reproduced; an information carrier having an information recording area for recording information suitable for reproduction using CLV/CAV control; and an information recording apparatus for recording information on the information carrier.

DISCLOSURE OF THE INVENTION

An information reproduction apparatus according to the present invention comprises a rotating section for rotating a disk-like information carrier on which a unit of continuous information capable of being continuously read out is recorded, a CLV control section for controlling the rotating section in such a manner that the information carrier is rotated at a constant linear velocity, a CAV control section for controlling the rotating section in such a manner that the information carrier is rotated at a constant angular velocity, a rotation control selection section for selectively operating the CLV control section or the CAV control section, and an information determination section for detecting an information length of the continuous information. The rotation control selection section is constructed in such a manner as to selectively operate the CLV control section or the CAV control section based on a result of the detection of the information length of the continuous information by the information determination section. Therefore, the above-described object can be achieved.

In one embodiment of this invention, when first information having the information length as detected by the information determination section larger than a predetermined size is reproduced, the CLV control section is operated, and when second information having the information length as detected by the information determination section smaller than the predetermined size is reproduced, the CAV control section is operated.

In one embodiment of this invention, when first information having the information length as detected by the information determination section larger than a predetermined size is reproduced, the CAV control section is controlled in such a manner that the information carrier is rotated at as low a number of revolutions as a level where a transfer rate required to reproduce information recorded in a most inner circumstance of the disk-like information carrier can be secured, and when second information having the information length as detected by the information determination section smaller than the predetermined size is reproduced, the CAV control section is operated.

In one embodiment of this invention, the continuous information includes a header portion recording a block size or a file size, and a data portion, and the information determination section is constructed in such a manner as to detect the information length based on a content of the header portion.

In one embodiment of this invention, the information carrier has a first information recording area at an inner circumference side and a second information recording area at an outer circumference side both arranged in a radial direction, and the first information is recorded in the first information recording area and the second information is recorded in the second information recording area.

Another information reproduction apparatus according to the present invention comprises a rotating section for rotating a disk-like information carrier on which moving image information is recorded, a CLV control section for controlling the rotating section in such a manner that the information carrier is rotated at a constant linear velocity, a CAV control section for controlling the rotating section in such a manner that the information carrier is rotated at a constant angular velocity, a rotation control selection section for selectively operating the CLV control section or the CAV control section, a reproduced signal processing section for reading out the moving image information from the information carrier and processing the moving image information, and an information determination section for determining whether or not a type of information to be reproduced is moving image information. The rotation control selection section is constructed in such a manner as to selectively operate the CLV control section or the CAV control section based on a result of the determination by the information determination section of whether or not information to be reproduced is moving image information. Therefore, the above-described objective can be achieved.

In one embodiment of this invention, when the information determination section determines that the type of information to be reproduced is moving image information, the CLV control section is operated.

In one embodiment of this invention, when the information determination section determines that the type of information to be reproduced is moving image information, the CAV control section is controlled in such a manner that the information carrier is rotated at as low a number of revolutions as a level where a transfer rate required to reproduce information recorded in a most inner circumstance can be secured.

In one embodiment of this invention, the information determination section is constructed in such a manner that when it is detected that an information length of information to be reproduced is greater than or equal to about 1 GB, the information determination section determines that the information to be reproduced is moving image information.

In one embodiment of this invention, the information determination section is constructed in such a manner that when a command specialized in reading of moving image information is input, the information determination section determines that the information to be reproduced is moving image information.

In one embodiment of this invention, the information determination section is constructed in such a manner that when it is verified that a regional code is recorded in the information carrier, the information determination section determines that the information to be reproduced is moving image information.

In one embodiment of this invention, the information determination section is constructed in such a manner that when it is verified that defect management information is not registered in the information carrier, the information determination section determines that the information to be reproduced is moving image information.

In one embodiment of this invention, the information determination section is constructed in such a manner that when it is verified that an extension of information to be reproduced indicates a MPEG or VOB file, the information determination section determines that the information to be reproduced is moving image information.

In one embodiment of this invention, the information determination section is constructed in such a manner that when it is verified that information to be reproduced is restrained under a parental lock, the information determination section determines that the information to be reproduced is moving image information.

The information determination section is constructed in such a manner that when it is verified that authentication has been conducted so as to protect copyright, the information determination section determines that the information to be reproduced is moving image information.

The information reproduction apparatus further comprises a focusing section for focusing a light beam to the information carrier; a focusing control section for controlling the light beam focused by the focusing section into a predetermined focus state; a tracking control section for controlling the light beam focused by the focusing section in such a manner that the light beam correctly scans a track on the information carrier, and a reproduced signal processing section for reproducing a signal read out from the information carrier.

An information carrier according to the present invention is a disk-like information carrier having a plurality of information recording areas. The plurality of information recording areas are separated along a radial direction of the information carrier, and information is recorded in each of the plurality of information recording area depending on the information length of a unit of continuous information capable of being continuously read out.

Preferably, information having an information length of continuous information larger than a predetermined size is recorded in the information recording area at an inner circumference side of the information carrier, and information having an information length of continuous information smaller than the predetermined size is recorded in the information recording area at an outer circumference side of the information carrier.

More preferably, a specific area for recording the number of the plurality of information recording areas, positional information of each information recording area, and a minimum size of continuous information recorded in each information recording area is further provided.

An information recording apparatus according to the present invention comprises a recording section for recording information including a unit of continuous information capable of being continuously recorded into a disk-like information carrier having a plurality of information recording areas separated along a radial direction of the information carrier. The information recording apparatus further includes an information determination section for detecting an information length of the continuous information, and the recording section is constructed in such a manner that the continuous information is recorded into the corresponding information recording area depending on the information length detected by the information determination section. Therefore, the above-described object can be achieved.

Preferably, the recording section is controlled by the information determination section in such a manner that information having an information length of continuous information larger than a predetermined size is recorded in the information recording area at an inner circumference side of the information carrier, and information having an information length of continuous information smaller than the predetermined size is recorded in the information recording area at an outer circumference side of the information carrier.

More preferably, the recording section is constructed in such a manner that the number of the plurality of information recording areas, positional information of each information recording area, and a minimum size of continuous information recorded in each information recording area are recorded in a specific area of the information carrier.

The information recording apparatus further comprises a rotating section for rotating the information carrier at a predetermined number of revolutions, a focusing section for bringing and focusing a light beam to the information carrier, a focusing control section for controlling the light beam focused by the focusing section into a predetermined focus state, and a tracking control section for controlling the light beam in such a manner that the light beam correctly scans a track on the information carrier.

BEST MODE FOR CARRYING OUT THE INVENTION

First, fundamental characteristic features of the present invention will be described.

An information reproduction apparatus according to the present invention determines the information length or information type (whether or not the information is a moving image) of continuous information and, based on a result of the determination, performs reproduction using CAV control or CLV control. As used herein, the term "continuous information" refers to a unit of information which can be continuously read from an optical disk.

The information length of continuous information is determined by detecting data relating to the information length of the information recorded in each header. When the information length is greater than a predetermined size CLV control, or CAV control in which the number of revolutions is limited, is performed. When the information length is less than the predetermined size, CAV control is performed. The information type, i.e., whether or not the information is a moving image, is estimated based on data relating to copyright protection, a regional code, code information for limiting reproduction, or the like.

An information carrier (optical disk) according to the present invention is a disk-like information carrier on which a plurality of information recording areas are provided for recording information, depending on the information length of continuous information. These information recording areas are separated along a radial direction of the information carrier. In the information carrier of the present invention, preferably, information having the information length of continuous information greater than a predetermined size is recorded in an information recording area provided at the inner circumference side of the information carrier, while information having the information length of continuous information less than the predetermined size is recorded in an information recording area provided at the outer circumference side of the information carrier.

Further, in the information recording apparatus of the present invention, a recording section is provided for recording information into a corresponding information recording area of the information carrier based on the information length of continuous information which is a unit of information capable of being continuously read from an optical disk. Preferably, information having the information length of continuous information greater than a predetermined size is recorded in an information recording area provided at the inner circumference side of the information carrier, while information having the information length of continuous information less than the predetermined size is recorded in an information recording area provided at the outer circumference side of the information carrier.

According to the present invention, rotational driving control (CLV or CAV control) optimal to information is performed in reproducing information, thereby reducing noise in reproducing music or video information. Further, an average access time and an average reproduction time for the entire information carrier can be reduced.

Hereinafter, embodiments of the present invention will be described with reference to the accompanying drawings.

(Embodiment 1)

Figure 1:
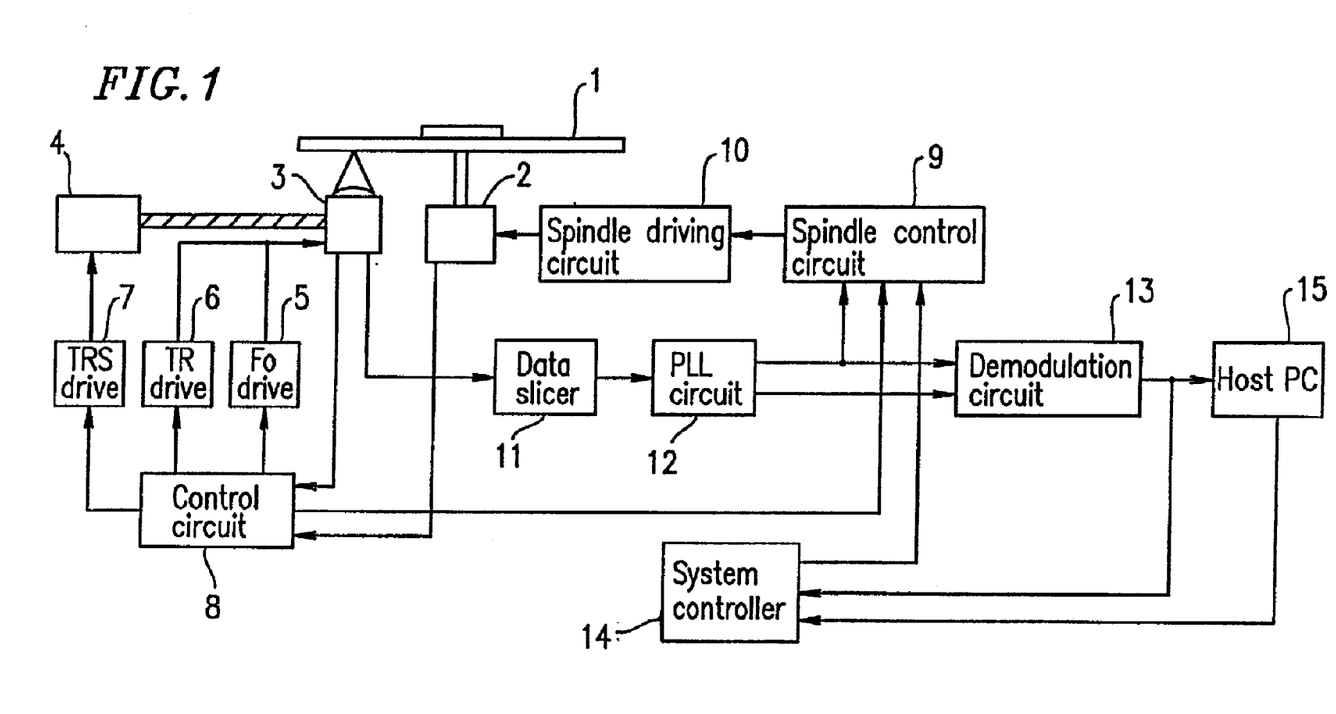
FIG. 1 is a block diagram showing a configuration of an information reproduction apparatus according to Embodiments 1 and 2 of the present invention.

An information reproduction apparatus and its reproduction method according to Embodiment 1 of the present invention will be described. FIG. 1 schematically shows a configuration of the information reproduction apparatus of Embodiment 1.

Information recorded on a disk 1 is read out by an optical pickup 3. More specifically, the optical pickup 3 correctly focuses a light beam to a pit or a mark recorded on a track of the disk 1 by employing a focusing section provided therein, and reads a signal based on the intensity of reflected light. The light beam is shifted to a desired track on the disk 1 by a traverse motor 4 which moves the optical pickup 3 in a radial direction of the disk 1.

The light beam is brought into focus on a disk, and is used to correctly scan a pit sequence (track), by a control circuit 8 which functions as follows. A focusing error signal and a tracking error signal input from the optical pickup 3 are subjected to low range compensation, phase compensation, and the like in the control circuit 8, and the compensated signal is fed back via a focus driving circuit 5 and a tracking drive circuit 6 to a focusing actuator and a tracking actuator provided in the optical pickup 3. Therefore, focusing servo control is performed in such a manner as to bring a light beam to focus on a disk, and, tracking servo control is performed in such a manner as to correctly scan a pit sequence (track).

The optical pickup 3 creates an RF (Radio Frequency) signal. The RF signal is converted to a binary signal by a data slicer 11. The binary signal is input to a PLL (Phase-Locked Loop) circuit 12. The PLL circuit 12 generates a reproduction clock frequency based on the binary signal and synchronously extracts a signal on the disk.

Rotation of the disk 1 is controlled by a spindle motor 2 (rotating section). In the present invention, such control of rotation is CLV control and CAV control. A control signal required for the spindle motor 2 to achieve CLV control or CAV control is generated by a spindle control circuit 9 (a CLV control section and a CAV control section). The spindle control circuit 9 generates a control signal for the spindle motor 2 from the reproduction clock frequency in the case of CLV control, and generates a control signal for the spindle motor 2 from an FG (Frequency Generator) signal obtained by a rotation detector of the spindle motor 2 in the case of CAV control. With these control signals, the rotation of the spindle motor 2 is controlled via a spindle drive circuit 10.

Figure 2:
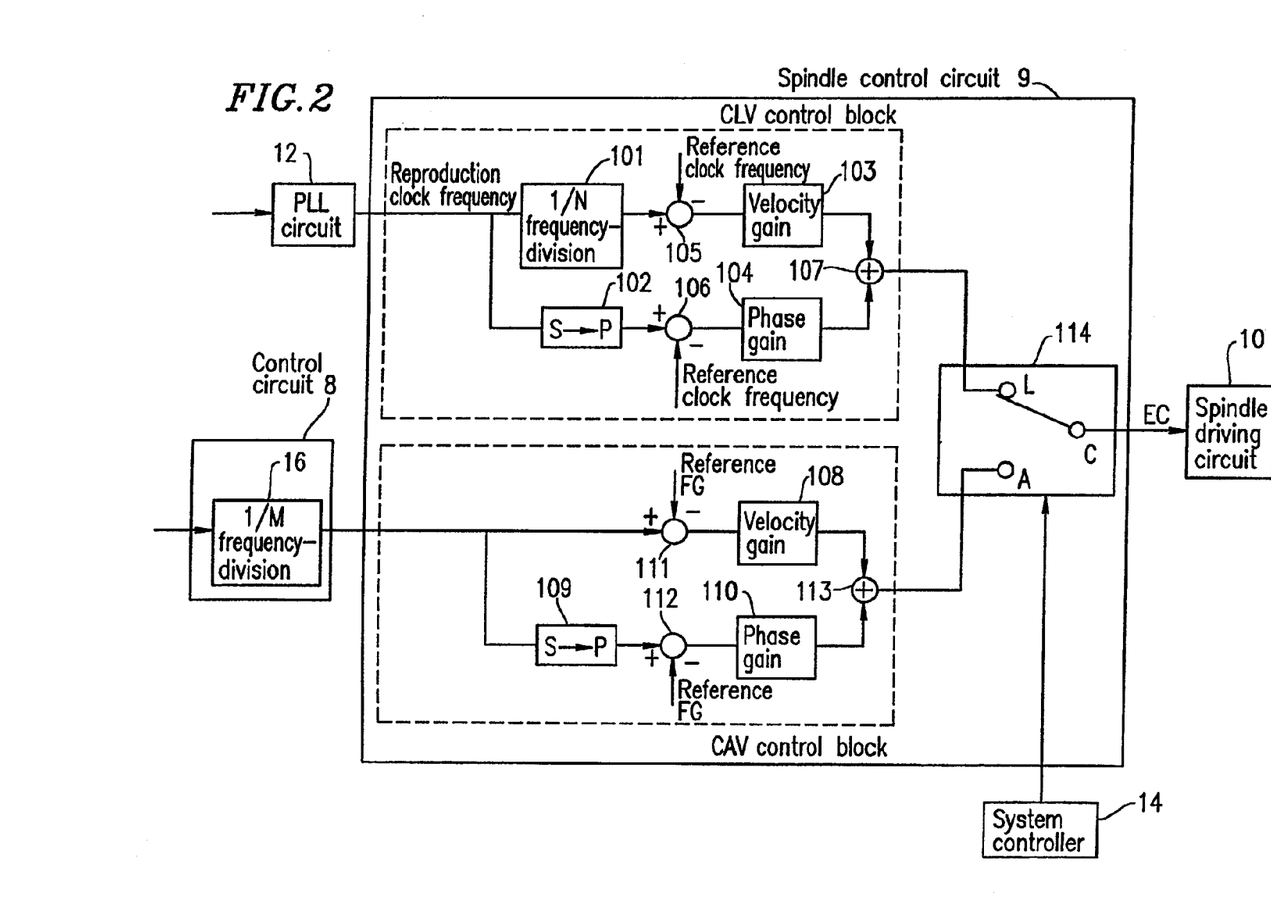
FIG. 2 is a block diagram showing a detailed configuration of a spindle control circuit in the information reproduction apparatus of FIG. 1.

Hereinafter, the CAV control and the CLV control of the spindle motor 2 and the switching therebetween will be described with reference to FIGS. 1 and 2. FIG. 2 is a block diagram showing a detailed internal configuration of the spindle control circuit 9 of FIG. 1.

First, the CLV control will be described. As described above, a binary signal output from the data slicer 11 is input to the PLL circuit 12. A reproduction clock frequency generated by the PLL circuit 12 is input to the spindle control circuit 9. The reproduction clock frequency input to the spindle control circuit 9 is converted by an S-P converter 102 from frequency information to phase information. Further, a subtracter 106 is used in calculating a phase error between the reproduction clock frequency and a reference clock frequency obtained by frequency division of a quartz oscillator. The resultant phase error is multiplied by a predetermined gain by a multiplier 104 and the result is input to an adder 107. By performing phase control in this manner, the variation rate of rotation with respect to load torque in a control region is theoretically zero, thereby making it possible to control the rotation of the spindle motor 2 within a jitter margin.

However, the sole use of the phase control causes the drive control system to be a second order system and therefore unstable. Therefore, as described below, frequency control is performed so as to produce a velocity control term which is in turn added to a phase control term, thereby stabilizing the drive control system. Specifically, the reproduction clock frequency is frequency-divided by a frequency divider 101 by a factor of N (where N is a natural number), and a frequency error between the divided clock frequency and the reference clock frequency is calculated via a subtracter 105, and multiplied by a predetermined gain by the multiplier 103, and the result is input to the adder 107. Thus, the velocity control term is added to the phase control term. A control signal EC to which a frequency error and a phase error are added is output via a switch 114 for switching CAV/CLV control to a spindle drive circuit 10. In this manner, CLV rotation control is achieved.

Next, the CAV control will be described. Similar to as described above, an FG signal generated by the rotation detector of the spindle motor 2 is input to the control circuit 8, and is then frequency-divided by a predetermined factor, and the result is input to the spindle control circuit 9. The input FG signal is converted by an S-P converter 109 from frequency information to phase information. A phase error between the converted FG signal and a reference FG signal corresponding to the constant number of revolutions generated by the control circuit 8 is calculated via a subtracter 112, and is multiplied by a predetermined gain by a multiplier 110, and the result is input to an adder 113. By performing phase control in this manner, the variation rate of rotation with respect to load torque in a control region is theoretically zero, thereby making it possible to control the rotation of the spindle motor within a jitter margin.

However, the sole use of the phase control causes the drive control system to be a second order system and therefore unstable. Therefore, a frequency error between the divided FG signal and the reference FG signal is calculated via a subtracter 111, and is multiplied by a predetermined gain by a multiplier 108, and the result is input to the adder 113 so as to perform frequency control to produce a velocity control term which is in turn added to the phase control term, thereby achieving stabilization. A control signal EC to which a frequency error and a phase error are added is output via the switch 114 for switching CAV/CLV control to a spindle drive circuit 10. In this manner, CAV rotation control is achieved.

Next, the switching between CAV control and CLV control will be described with reference to FIG. 3 as well as FIGS. 1 and 2.

Figure 3:
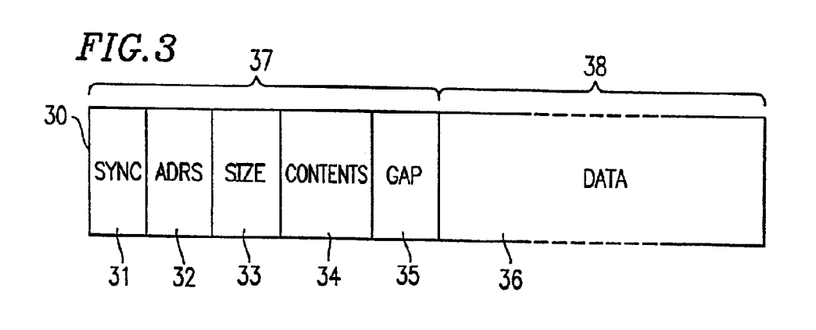
FIG. 3 is a schematic diagram showing a logical format of information to be reproduced by the information reproduction apparatus of Embodiment 1.

FIG. 3 schematically shows an exemplary format of one piece of continuous information 30. To make it easier to switch between CAV control and CLV control, the information 30 includes divided portions, i.e., a header portion 37 and a data portion 38. Further, the header portion 37 includes the following information: SYNC 31 for frame synchronization: ADRS 32 indicating the address of the recorded information; SIZE 33 indicating the size of the information (block size or file size); CONTENTS 34 indicating the type of the information; and GAP 35 indicating a boundary between the header portion 37 and the data portion 38. A reproduced signal extracted by synchronizing with the generated reproduction clock frequency in the PLL circuit 12 is subjected to error correction and demodulation by a demodulation circuit 13 (see FIG. 1). The size of the information to be reproduced (information length) is determined and processed by a system controller 14 based on information in the header portion 37 detected by the demodulation circuit 13.

When a piece of continuous information to be reproduced has a size greater than a predetermined size, the system controller 14 transmits a control signal to the switch 114 to switch to a side L, i.e., for CLV control. When a piece of continuous information to be reproduced has a size smaller than the predetermined size, the system controller 14 transmits a control signal to the switch 114 to switch to a side A, i.e., for CAV control. The above-described predetermined size is the lower limit of the information length range of continuous information which is judged to be suitable for reproduction using CLV control or the upper limit of the information length range of continuous information which is judged to be suitable for reproduction using CAV control, depending on the purposes of the use of the information and considering reproduction performance, access performance, vibration noise of a spindle motor, and the like. The same is applied to the following Embodiments 3 and 4 of the present invention.

In the present invention, the system controller 14 functions as an information determination section for detecting the information length of continuous information, and a rotation control selection section for selectively operating a CLV control section or a CAV control section. A signal which has been subjected to error correction and demodulation by the demodulation circuit 13 is reproduced by a host PC 15 (reproduction signal processing section) with a well-known method.

In this manner, reproduction by CAV control and reproduction by CLV control are switched, depending on the continuity (information length) of information to be recorded, thereby efficiently reproducing information on a disk. Information is recorded to an appropriate place of the optical disk, depending on its size, so that information can be efficiently reproduced using CLV/CAV control. Specifically, for example, audio or video data having a large information length to be continuously reproduced is generally recorded at the inner circumference side of a disk, while code information having a small information length to be continuously reproduced is generally recorded at the outer circumference side of the disk (this is described in detail later in Embodiment 3). Specifically, CLV control holding a required reproduction velocity is performed for audio or video data, while CAV control is performed for code information so that fast-speed random access is achieved.

In the above description, continuous information having an information length greater than a predetermined size is reproduced using CLV control. The present invention is not limited to this. Instead of CLV control, CAV control in which the number of revolutions is limited to a constant range may be used to reproduce continuous information having a large information length. A constant range of the number of revolutions refers to the number of revolutions which is low as that in which a transfer rate (reproduction rate) required for reproduction of information recorded in the most inner circumference of a disk can be secured, for example. This constant range is preferably about 1.5 to 3 times as large as the number of revolutions of a disk corresponding to a minimum transfer rate required for reproduction of information recorded in the most inner circumference of the disk, taking into consideration a balance among the margin of the transfer rate, vibration of a rotating section, and the like. For example, about 1.5 times may be for a reproduction apparatus having large vibration. About 3 times may be for a reproduction apparatus having small vibration. With CAV control having the low number of revolutions, a required reproduction rate can be secured for continuous information having a large size.

Further, the present invention can be used no matter as to whether two kinds of information requiring different rotational driving control methods, i.e., continuous information having an information length larger than a predetermined size and continuous information having an information length less than the predetermined size, are stored on the same disk or different disks.

(Embodiment 2)

Hereinafter, an information reproduction apparatus and its reproduction method according to another embodiment of the present invention will be described.

In Embodiment 1, the switching between CLV control and CAV control is performed based on the size of continuous information. In Embodiment 2, the switching is performed based on the type of information (audio/video information or code information). Particularly, whether or not information is moving image information is determined before reproduction of moving image information. Based on the result, an optimal reproduction rate is provided so that appropriate rotation control can be performed. Whether or not information to be reproduced is moving image information is determined with high probability by recognizing additional information and contents relating to functions recorded in a disk other than the moving image information.

A configuration of the information reproduction apparatus of Embodiment 2 is basically similar to that shown in FIGS. 1 and 2 relating to Embodiment 1. Therefore, a description thereof is here omitted. Hereinafter, a fundamental operation of the switching between CLV/CAV control will be briefly described.

The system controller 14 (FIG. 1) transmits a control signal to the switch 114 in the spindle control circuit 9 to switch to a side L, i.e., for CLV control, when information to be reproduced is moving image information. Alternatively, the system controller 14 transmits a control signal to the switch 114 in the spindle control circuit 9 to switch to a side A, i.e., for CAV control. In this case, in the CAV control, the number of revolutions is limited to a low level where a transfer rate required for reproduction of information recorded in the most inner circumference of a disk can be secured. In other words, the number of revolutions is limited to a velocity which causes substantially no problem in processing for sound reproduction. This low-level range is preferably about 1.5 to 3 times as large as the number of revolutions of a disk corresponding to a minimum transfer rate required for reproduction of information recorded in the most inner circumference of the disk, taking into consideration a balance among the margin of the transfer rate, vibration of a rotating section, and the like. For example, about 1.5 times may be for a reproduction apparatus having large vibration. About 3 times may be for a reproduction apparatus having small vibration.

As described above, if it is verified that information to be reproduced is moving image information, a mode for securing a maximum transfer rate (CAV control) is switched to a mode for securing a transfer rate required for reproduction of moving images (CLV control, or CAV control in which the above-described number of revolutions is limited). Therefore, vibration of a mechanism or a disk, or rotation noise or wind noise of a motor can be reduced as much as possible.

Hereinafter, a description will be given of a method for determining whether information to be reproduced is moving image information or information other than a moving image.

[Identification of Moving Image Information Based on Information Length]

The system controller 14 determines that information to be reproduced is moving image information, when the information length of continuous information to be reproduced is greater than or equal to about 1 GB.

A file size indicating whether or not the information length is greater than or equal to 1 GB is recorded as information in a management area at a predetermined position on the disk 1. When an apparatus is activated, the management area is read out, and the file size is stored in RAM (Random Access Memory) in the system controller 14 along with a title, a volume name, and a recording position address on the disk 1. When this information is actually reproduced, whether or not the file size is greater than or equal to 1 GB is determined based on the management information stored on the RAM. When the file size is greater than or equal to 1 GB, the information is presumed to be moving image information, and rotational driving control is performed based on the above-described configuration and sequence. Specifically, CLV control, or CAV control in which the number of revolutions is limited, is performed. This method for identifying moving image information can be applied to both a ROM disk and a RAM disk.

[Identification of Moving Image Information Using a Specialized Command for Moving Image Information]

The system controller 14 determines that information to be reproduced is moving image information, when an AV read command which is a moving image information read only command is transmitted from a host PC 15.

When it is determined that information to be reproduced is moving image information, the rotation control of the spindle motor 2 is switched in execution of the AV read command as described above. Since it is not necessary to additionally issue a control command from the host PC 15 to reduce the number of revolutions, the overhead of communication with the host PC 15 can be reduced. This method for identifying moving image information can be applied to both a ROM disk and a RAM disk.

[Identification of Moving Image Information Based on Regional Code]

The system controller 14 typically attempts to obtain a regional code stored in the disk 1 during spin-up. Regional codes are grouped into 6 regions shown in Table 1 below, so that regions in which information can be reproduced are limited. When the regional code is recorded, it is determined that information to be reproduced is moving image information, and the rotation control of the spindle motor 2 is switched as described above during or immediately after spin-up. This method for identifying moving image information can be applied to a ROM disk.

TABLE 1

1: U.S., Canada, U.S. Territories
2: Japan, Europe, South Africa, Middle East (including Egypt)
3: Southeast Asia, East Asia (including Hong Kong)
4: Australia, New Zealand, Pacific Islands, Central America, Mexico, South America, Caribbean
5. Eastern Europe (Former Soviet Union), Indian Subcontinent, Africa (also North Korea, Mongolia)
6: China

[Identification of Moving image Information Based on Defect Management Information]

In the case of a recordable disk, defect management information used to manage a defective sector is registered in a DMA (Defect Management Area) on the disk 1 in order to prevent false recording or recording failure to a defective sector so as to secure reliability. When a defective sector is present, a recording destination is changed from the defective sector to an alternate sector in which recording is performed. In the case of moving image information requiring the temporal connectivity (continuity) of a file, the change of a recording destination leads to system failure. Therefore, even if false recording or recoding failure occurs to some extent, recording is just continued so that exchanging is not performed. Such a method has been proposed.

For a disk adopting this proposal, the system controller 14 obtains defect management information from a DMA when the apparatus is activated, thereby determining that information to be reproduced is moving image information when there is no registered defect management information. Based on the determination, the rotation control of the spindle motor 2 is switched as described above. This method for identifying moving image information can be applied to a RAM disk.

[Identification of Moving Image Information Based on the Contents of the Head Portion of Information]

The type of information (audio information, video information, or code information) recorded in the CONTENTS 34 (see FIG. 3) in the header portion 37 of information is detected by the system controller 14, so that it can be determined whether or not information to be reproduced is moving image information. Based on the determination, the rotation control of the spindle motor 2 is switched as described above. This method of identifying moving image information can be applied to both a ROM disk and a RAM disk.

[Identification of Moving Image Information Based on Recorded Contents regarding to the Type of File]

The type of file is previously recorded as information in a management area at a predetermined position on the disk 1. When an apparatus is activated, the management area is read out, and the file size is stored in RAM in the system controller 14 along with a title, a volume name, and a recording position address written on the disk 1. When this information is actually reproduced, information to be reproduced is estimated to be moving image information if it is determined by the system controller 14 based on the management information stored in the RAM that the extension of reproduced information is MPEG (Motion Picture Expert Group) or VOB (Video Object). Similar to the above-described configuration and sequence, based on the determination, the rotation control of the spindle motor 2 is switched. This method of identifying moving Image information can be applied to both a ROM disk and a RAM disk.

[Identification of Moving Image Information Based on Code Information for Limiting Reproduction]

When information to be reproduced is restrained under a parental lock in order to limit reproduction of contents including violence, sexual scenes or the like, or when information to be reproduced includes information having a screen size of 16:9 letter box peculiar to movies, the information to be reproduced can be estimated to be moving image information by the system controller 14. Based on the determination, the rotation control of the spindle motor 2 is switched as described above. This method of identifying moving image information can be applied to a ROM disk.

[Identification of Moving Image Information Based on BCA]

In the case of a ROM disk which is a reproduction only disk, it is difficult to provide a management area in disk stamping and store a flag indicating a moving image or a moving image file size in terms of capacity and compatibility. Taking this into consideration, the information that recorded information is moving image information is recorded in a BCA (Burst Cutting Area) in a most inner circumference of a disk. By reading the BCA at a required timing, whether or not information to be reproduced is moving image information is determined by the system controller 14. Based on the result of the determination, the rotation control of the spindle motor 2 is switched as described above. This method of identifying moving image information can be applied to both a ROM disk and a RAM disk.

[Identification of Moving Image Information Based on Authentication of Information]

Moving image information to be reproduced often has copyright. Therefore, when information is authenticated, it is estimated by the system controller 14 that information to be reproduced is moving image information. Based on this estimation, the rotation control of the spindle motor 2 is switched as described above. This method of identifying moving image information can be applied to both a ROM disk and a RAM disk.

The above description relates to the case where the information reproduction apparatus per se identifies moving image information and the rotational driving control of a disk is switched. Other than such identification/switching methods, the user may identify the type of information by noting the title of information to determine whether or not the information is a moving image for appreciation, whether or not the information is code information for installing, or the like (i.e., the purpose of use). Therefore, a moving image switch may be attached to the information reproduction apparatus, and the user may turn the switch ON in the case of moving image information. In this case, CLV control for a moving image, or CAV control in which a transfer rate is secured for reproduction of a moving image at the most inner circumference, can be easily selected.

As described above, to estimate whether or not information is a moving image, necessary information can be obtained by reading a management area or the like, which includes additional information or functions, instead of moving image information to be reproduced. Further, a switch is provided in order for the user to have an opportunity to select type of information, such that moving image information can be identified with a higher probability. Thus, the type of information is identified and an appropriate rotational driving control is performed, thereby making it possible to minimize noise and vibration generated from the apparatus.

The present invention can be used no matter as to whether two kinds of information requiring different rotational driving control methods, i.e., moving image information and information other than moving image information, are stored on the same disk or different disks.

(Embodiment 3)

Figure 4:
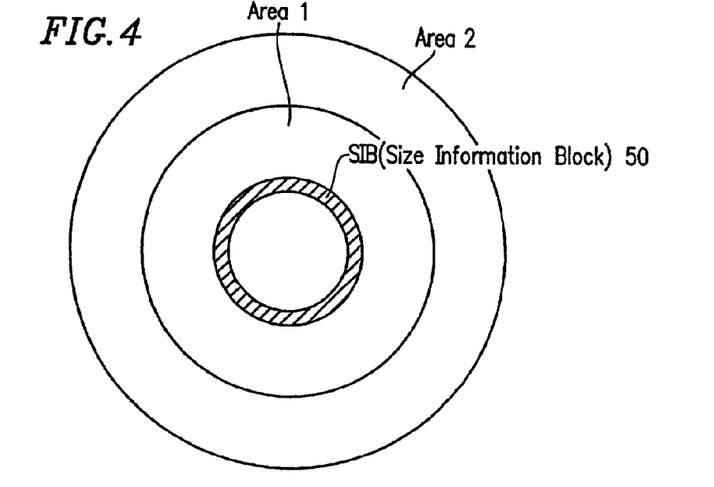
FIG. 4 is a schematic plan view showing a configuration of an information carrier according to Embodiment 3 of the present invention.

Hereinafter, an information carrier (disk) according to Embodiment 3 of the present invention will be described. FIG. 4 is a plan view showing the information carrier of Embodiment 3.

The information carrier recording carrier of the present invention includes a plurality of information recording areas (areas 1 and 2) separated along a radial direction of the information carrier as shown in FIG. 4. Information is recorded in each of these information recording areas, depending on the information length of continuous information. Specifically, information having an information length of continuous information larger than a predetermined size, such as audio information and video information, is recorded in the area 1 in the inner circumference side of the information carrier, while information heaving an information length of continuous information smaller than the predetermined size, such as a short file (i.e., code information), is recorded in the area 2 in the outer circumference side of the information carrier. If an information length of information to be continuously reproduced has a length larger than the predetermined size, the information is recorded in the area 1 in the inner circumference side even in the case of code information. The widths in a radial direction of areas 1 and 2 are appropriately adjusted, depending on the amount of information to be recorded in the respective areas.

The structure of the information carrier of Embodiment 3 has the following meaning.

A disk in which information is to be recorded (or has been record) with CLV control is subjected to CAV control, where the disk is rotated at a constant number of revolutions, so that as the track is closing to the outer circumference, the reproduction rate is increased. The upper limit of the reproduction rate is generally determined by a frequency characteristic of an optical pickup or a signal processing circuit and the maximum number of revolutions of a spindle motor. Therefore, when random access for code information is performed in an outer circumference and sequential access for audio/video information is performed in an inner circumference, handling or access performance and reading performance can be expected to be substantially improved.

In view of this, information is disposed in the information carrier of the present invention, depending on the size of continuous information as described above. Information on a disk can be efficiently reproduced using the information reproduction apparatuses described in Embodiments 1 and 2. Information having a large size of continuous information, such as audio or video data, can be reproduced with CLV control having a required reproduction rate (or CAV control having a limited number of revolutions as described in Embodiment 2), while information having a small size of continuous information, such as code information, can be reproduced with CAV control while performing fast random access.

Figure 5:
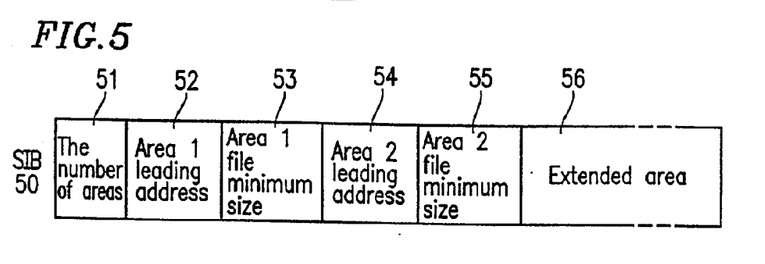
FIG. 5 is a schematic diagram showing a logical format of a most inner circumference information portion of the information carrier of FIG. 4.

When information is recorded in the information carrier of Embodiment 3, a SIB (Size Information Block) area 50 may be effectively provided at a most inner circumference of a disk so as to further easily switch between CLV/CAV control. FIG. 5 shows a format of information on an information recording area, with which information is recorded depending on the size of information (continuous information) to be continuously reproduced, that is recorded in the SIB (Size Information Block) area 50.

As shown in FIG. 5, the SIB area includes a portion 51 for storing a value of the total number of areas in a disk, a portion 52 for storing the leading address of the area 1, a portion 53 for storing the minimum size of a file recorded in the area 1, i.e., the threshold values of the areas 1 and 2, a portion 54 for storing the leading address of the area 2, and a portion 55 for storing the minimum size of a file recorded in the area 2, i.e., the minimum size of continuous information to be continuously reproduced. When this SIB information is read out and stored upon activation of an apparatus, the switching between the areas 1 and 2, i.e., between CAV control and CLV control (or CAV control of Embodiment 2 which limits the number of revolutions) can be even more easily performed.

Although, in Embodiment 3, it is described that two areas (the areas 1 and 2) are provided for recording information to be reproduced, three or more areas may be provided for recording information, depending on types or sizes of files. In this case, the total number of areas is stored in the area 51, and the leading address, the minimum size, etc., of an area 3 are stored in an extended area.

Hereinafter, a specific embodiment in which information is recorded using the information carrier of FIG. 4 and is further reproduced will be described.

EXAMPLE 1

Figure 6:
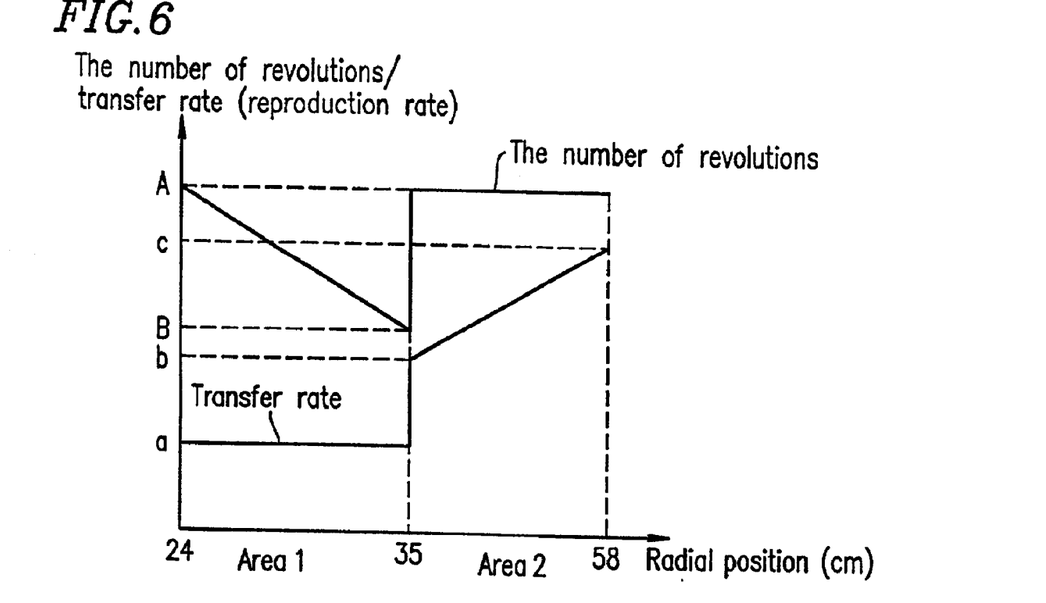
FIG. 6 is a characteristic graph showing relationships between a radial position, and the number of revolutions and a transfer rate, of an information carrier of a first example of Embodiment 3.

A description will be given of a first example, in which it is assumed that music information having a total size of 1 GB when it is continuously reproduced, such as a 3D-stereo recording Beethoven's "Choral", is recorded in the area 1, and a variety of text or code information of 1 MB or less including Beethoven's personal history, music scores, performers' profiles, and/or pictures is recorded in the area 2. The areas 1 and 2 range, for example, in radius from about 24 mm to 35 mm and from about 35 mm to 58 mm, respectively. FIG. 6 shows a relationship between the areas 1 and 2 as to the number of revolutions and the transfer rate (reproduction rate).

When music is appreciated, the area 1 at the inner circumference side is accessed, CLV control is selected, and information recorded in a track is sequentially read out. A light beam is moved toward the outer circumference along a spiral track while reading out information with the lapse of time. The rotation of the spindle motor 2 (FIG. 1) is linearly decreased so as to maintain a constant linear velocity. The number of revolutions is equal to A (rpm) at the leading radius of 24 mm of the area 1 and is reduced up to B (rpm) at the end radius of 35 mm. In this case, the transfer rate is controlled by CLV control in such a manner as to be a constant value (aMB/s). Further, the rotation of the spindle motor may be further decreased up to a minimum reproduction rate (required for processing during sound reproduction without a problem) by performing the CLV control, thereby making it possible to reduce the rotation noise of the spindle.

Data relating to music other than the music per se is recorded in the area 2. The required data is randomly accessed by a host application. A host recognizes the leading address of the area 2 according to the SIB information. Therefore, when starting access to the area 2, the host switches the CLV control to CAV control for the spindle motor so that the number of revolutions is constant (A rpm). A light beam is moved within the area 2 as required while reading out data recorded therein. In this case, as the track is closing to the outer circumference, the transfer rate (reproduction rate) is increased, and the response time of the spindle motor is zero due to CAV control, whereby considerably fast access can be achieved in the area 2.

SECOND EXAMPLE

A description will be given of a second example, in which it is assumed that information having a large size and requiring a fast read rate, such as high-quality image information, is recorded in the area 1, while a variety of information including a reduced image, a control program, or other code information are recorded in the area 2. The widths of the areas 1 and 2 are set to the same sizes as those of Example 1.

Figure 7:
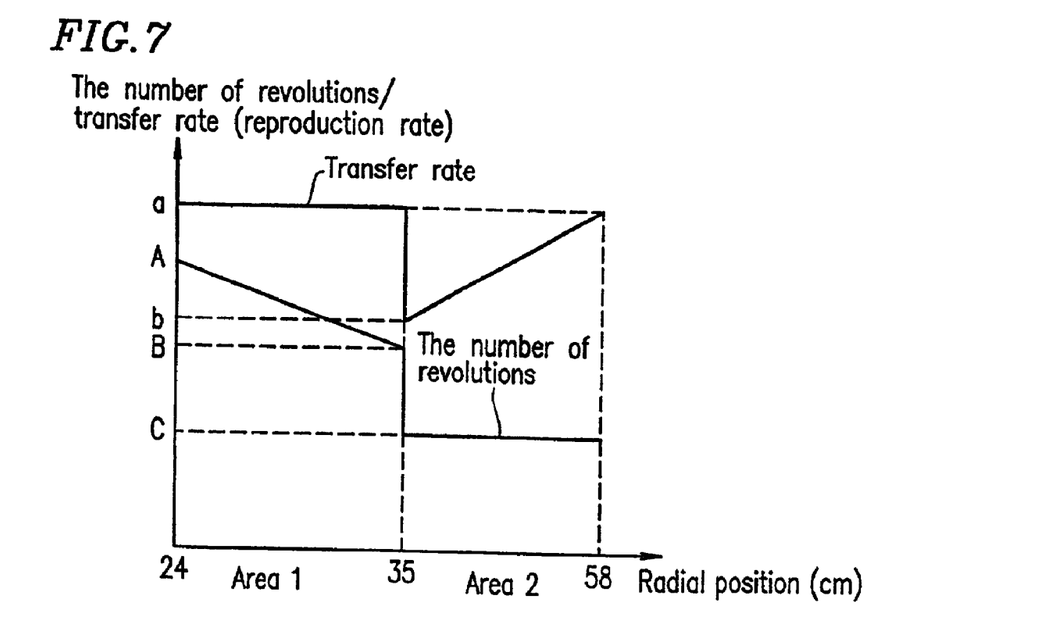
FIG. 7 is a characteristic graph showing relationships between a radial position, and the number of revolutions and a transfer rate, of an information carrier of a second example of Embodiment 3.

As with the case where recorded information is audio information, information in the area 1 is reproduced with CLV control while information in the area 2 is reproduced with CAV control. It should be noted that a read rate is important for image information unlike audio information, so that the linear velocity of CLV control in the area 1 is set to as high a value as possible while taking into consideration a frequency characteristic of an optical pickup or a signal processing circuit and the maximum number of revolutions of a spindle motor. A relationship between the areas 1 and 2 as to the number of revolutions and the transfer rate (reproduction rate) is shown in FIG. 7.

In the area 1 in which sequential reading is predominant, the number of accesses is small, so that reading performance is paramount and the spindle motor 2 is therefore controlled in such a manner that reading is performed with CLV control and at a fast and constant transfer rate (aMB/s). In the area 2 in which random access is predominant, access performance is paramount and therefore the number of revolutions of the spindle motor 2 is set to be constant © rpm) with CAV control so that fast access can be achieved.

Thus, information to be continuously reproduced (continuous information), i.e., a file having a large size is recorded in an area at the inner circumference side of the disk, while continuous information to be randomly reproduced, i.e., a file having a small size is recorded in an area at the outer circumference side. Therefore, information on a single disk can be effectively reproduced in terms of an access speed, noise and a read rate.

(Embodiment 4)

Figure 8:
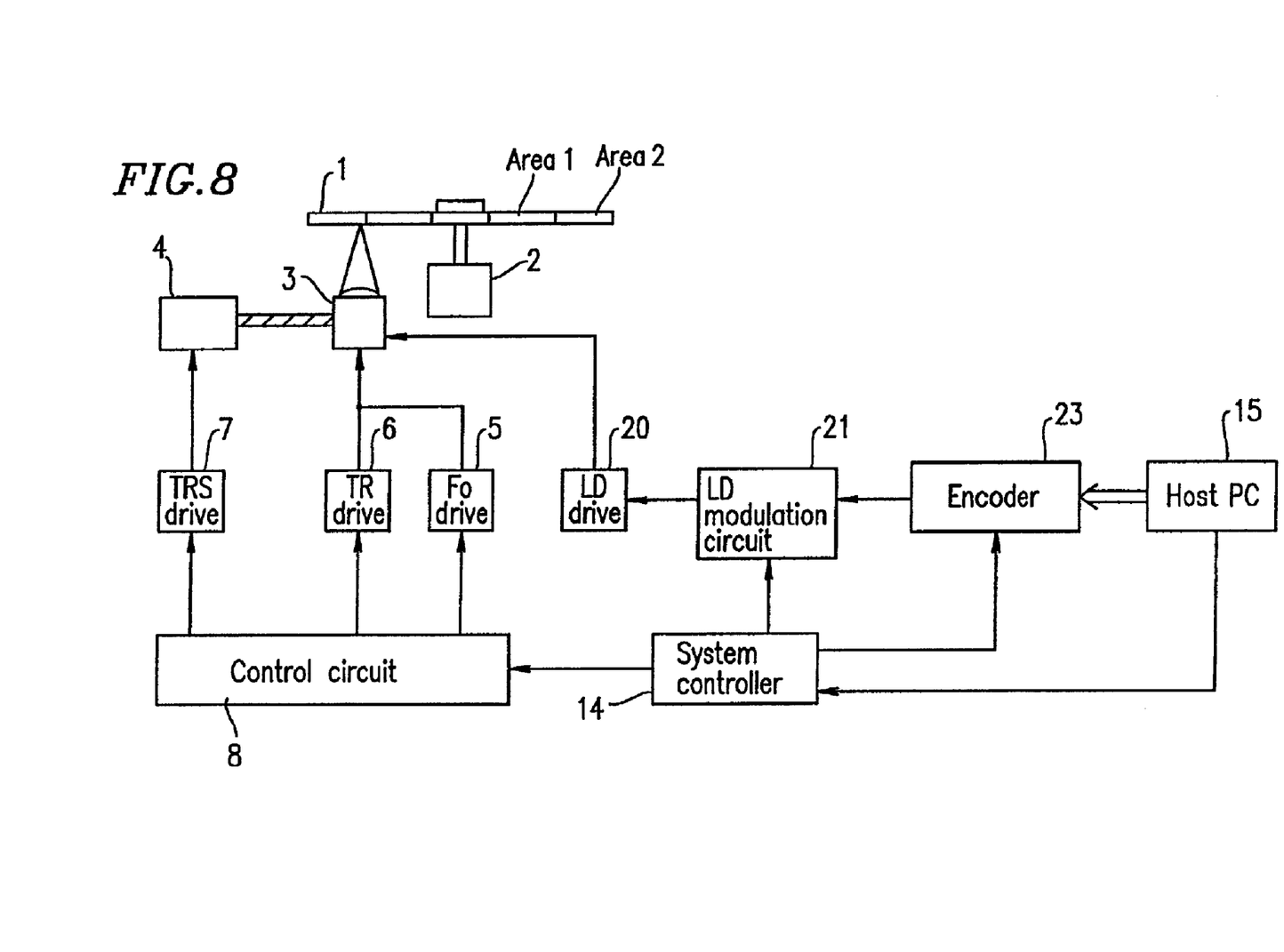
FIG. 8 is a block diagram showing a configuration of an information recording apparatus according to Embodiment 4 of the present invention.

Next, an information recording apparatus for recording information onto the disk (FIG. 4) of Embodiment 3 and a method used therein will be described as Embodiment 4 of the present invention. FIG. 8 is a block diagram showing a configuration of the information recording apparatus of Embodiment 4. Parts similar to those of the information reproduction apparatus of Embodiment 1 are indicated by the same numerals and a description thereof is thus omitted.

Information recorded in the host PC 15 (recorded information) is transferred to an encoder 23. The recorded information is subjected to scrambling and modulation, and the resultant information is modulated into a signal indicating the intensity of laser light by a LD (Laser Diode) modulation circuit 21. The signal is transferred via a LD (Laser Diode) drive circuit 20 to the optical pickup 3 (also serves as a recording section). Marks are recorded in a track on the disk 1 by modulating laser light having recording power which is about 10 times as strong as reproducing power. In this case, the host PC 15 transmits to a system controller 14 an information length signal indicating the continuity of information to be recorded. In accordance with the information length signal, the system controller 14 transmits an instruction to the control circuit 8, so that an area to be recorded and a track in the area are selected.

For example, when music information having a large size of continuous information is recorded, a light beam is shifted by a traverse motor 4 to the area 1 at the inner circumference side of the disk. The continuous music information is recorded in an appropriate empty track of the area 1. When code information having a small size of continuous information is recorded, a light beam is shifted by the traverse motor 4 to the area 2 at the outer circumference side. The continuous code information is recorded in an appropriate empty track of the area 2. Therefore, a large size of information to be continuously reproduced is recorded in the area 1 at the inner circumference side, while a small size of information to be continuously reproduced is recorded in the area 2 in the outer circumference side. Whether the size of continuous information is large or small can be determined using about 1 GB as a criterion, for example.

In Embodiment 4, for recording, the spindle motor 2 is preferably controlled in such a manner as to record information to be continuously recorded or reproduced, such as audio information, with CLV control and information to be randomly reproduced, such as code data, with CAV control. A control method used in recording may be stored in the form of bit information as additional information in a header portion. In this case, CAV control and CLV control can be switched based on such bits when reproduction is performed.

Further, when the response time of laser or recording compensation are taken into consideration, a modulation frequency needs to be increased as the track is closing to the outer circumference in the case where recording is performed with CAV control. It is difficult to achieve this when a recording density and a transfer rate are certain values. In this case, all recording is performed with CLV control, and only reproduction is performed with CAV control and CLV control which are switched therebetween depending on information.

INDUSTRIAL APPLICABILITY

As described above, according to the information reproduction apparatus of the present invention, CAV control and CLV control are switched between depending on properties of the information, such as the size or type of continuous information to be continuously reproduced. Therefore, information recorded on a single disk or different disks can be reproduced with appropriate rotational driving control depending on the properties, thereby making it possible to improve access performance. Since rotation is not increased more than necessary for the properties of the information, noise or vibration of the apparatus due to rotation of a spindle motor is reduced.

Further, according to the information carrier and the information recording apparatus of the present invention, data having a large size of continuous information to be continuously reproduced is recorded at the inner circumference side of a disk, while data having a small size of continuous information to be continuously reproduced is recorded at the outer circumference side of the disk. Therefore, an even higher level of access performance can be achieved in reproduction. According to the information carrier of the present invention, continuous information, such as music and video, is previously recorded in an inner circumference area of a disk as pit information in the form of pits and lands. Subsequently, information created by a user, or the like can be additionally recorded in an outer circumference area of a disk. The rotation of such a partial ROM disk can be easily controlled in reproduction/recording according to the present invention.

What is claimed is:

1. An information reproduction apparatus comprising: a rotating section for rotating a disk-like information carrier on which a plurality of pieces of continuous information each capable of being continuously read out are recorded; a CLV control section for controlling the rotating section in such a manner that the information carrier is rotated at a constant linear velocity; a CAV control section for controlling the rotating section in such a manner that the information carrier is rotated at a constant angular velocity; a rotation control selection section for selectively operating the CLV control section or the CAV control section; and an information determination section for detecting an information length of each of the plurality of pieces of continuous information, wherein the rotation control selection section is constructed in such a manner as to selectively operate the CLV control section or the CAV control section for a respective one of the plurality of pieces of continuous information based on the detected information length of the respective one of the plurality of pieces of continuous information by the information determination section.

2. An information reproduction apparatus according to claim 1, wherein when a first piece of continuous information having an information length as detected by the information determination section larger than a predetermined size is reproduced, the CLV control section is operated, and when a second piece of continuous information having an information length as detected by the information determination section smaller than the predetermined size is reproduced, the CAV control section is operated.

3. An information reproduction apparatus according to claim 1, wherein when a first piece of continuous information having an information length as detected by the information determination section larger than a predetermined size is reproduced, the CAV control section is controlled in such a manner that the information carrier is rotated at as low a number of revolutions as a level where a transfer rate required to reproduce information recorded in a most inner circumference of the disk-like information carrier can be secured, and when a second piece of continuous information having an information length as detected by the information determination section smaller than the predetermined size is reproduced, the CAV control section is operated.

4. An information reproduction apparatus according to claim 1, wherein each of the plurality of pieces of continuous information includes a header portion recording a block size or a file size, and a data portion, and the information determination section is constructed in such a manner as to detect the information length based on a content of the header portion.

5. An information reproduction apparatus according to claim 2, wherein the information carrier has a first information recording area at an inner circumference side and a second information recording area at an outer circumference side both arranged in a radial direction, and the first piece of continuous information is recorded in the first information recording area and the second piece of continuous information is recorded in the second information recording area.

6. An information reproduction apparatus according to claim 1, further comprising: a focusing section for focusing a light beam to the information carrier; a focusing control section for controlling the light beam focused by the focusing section into a predetermined focus state; a tracking control section for controlling the light beam focused by the focusing section in such a manner that the light beam correctly scans a track on the information carrier; and a reproduced signal processing section for reproducing a signal read out from the information carrier.

* * * * *

UNITED STATES PATENT AND TRADEMARK OFFICE
CERTIFICATE OF CORRECTION

PATENT NO. : 6,870,802 B1  Page 1 of 1
APPLICATION NO. : 09/979577
DATED : March 22, 2005
INVENTOR(S) : Naohiro Kimura, Katsuya Watanabe and Hiromichi Ishibashi It is certified that error appears in the above-identified patent and that said Letters Patent is hereby corrected as shown below:

On Title Page, Item (56), FOREIGN PATENT DOCUMENTS
line 1, "4/1989" should read --8/1989--;
line 2, "2/1993" should read --4/1993--;
line 4, "5/1995" should read --9/1995--;
line 5, "5/1999" should read --11/1999--; and
line 6, "411306661A" should read --11-306661 A--.

Signed and Sealed this

Fourth Day of March, 2008

JON W. DUDAS
*Director of the United States Patent and Trademark Office*